United States Patent [19]
Tsuda et al.

[11] 3,875,111
[45] Apr. 1, 1975

[54] CATIONIC POLYMERS OF TERTIARY, DIAMINES, BIS(CHLOROACETYL)GLYCOLS AND TRIS(N,N-DIMETHYL AMINO ALKYL)PHENOL

[75] Inventors: Minoru Tsuda; Takamitsu Yuki; Akio Yoshida, all of Tokyo, Japan

[73] Assignee: Chugai Seiyaku Kabushiki Kaisha, Tokyo, Japan

[22] Filed: Feb. 28, 1972

[21] Appl. No.: 229,825

[30] Foreign Application Priority Data
Mar. 5, 1971 Japan.................. 46-11532
Mar. 5, 1971 Japan.................. 46-11533
July 28, 1971 Japan.................. 46-56012

[52] U.S. Cl.............. 260/47 CZ, 210/54, 260/2 R, 250/2.2 R, 260/30.8 R, 260/31.2 N, 260/32.6 N, 260/32.8 N, 260/33.4 R, 260/47 CP, 260/61, 260/75 N

[51] Int. Cl............................................. C08g 17/00
[58] Field of Search....... 260/47 CZ, 2 R, 61, 75 N, 260/47 CP, 2.2 R

[56] References Cited
UNITED STATES PATENTS
2,261,002  10/1941  Ritter...................................... 260/2
2,807,910  10/1957  Erickson.................................. 260/2
3,265,734  8/1966   Kraiman et al. ........................ 260/2
3,671,468  6/1972   Tsuda et al. ........................... 260/2 R

*Primary Examiner*—Lester L. Lee
*Attorney, Agent, or Firm*—Browdy and Neimark

[57] ABSTRACT

Novel cationic polymers comprising a repeating unit represented by the formula

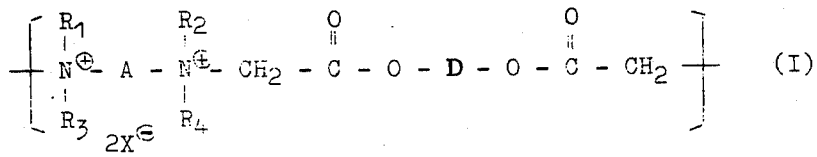

wherein A, D and X are as defined hereinafter, which are useful for pharmaceutical preparations and useful as a coagulating or flocculating agent for clarifying crude water in the reservoir for water supply, industrial water and sewage or drainage water are disclosed.

25 Claims, 1 Drawing Figure

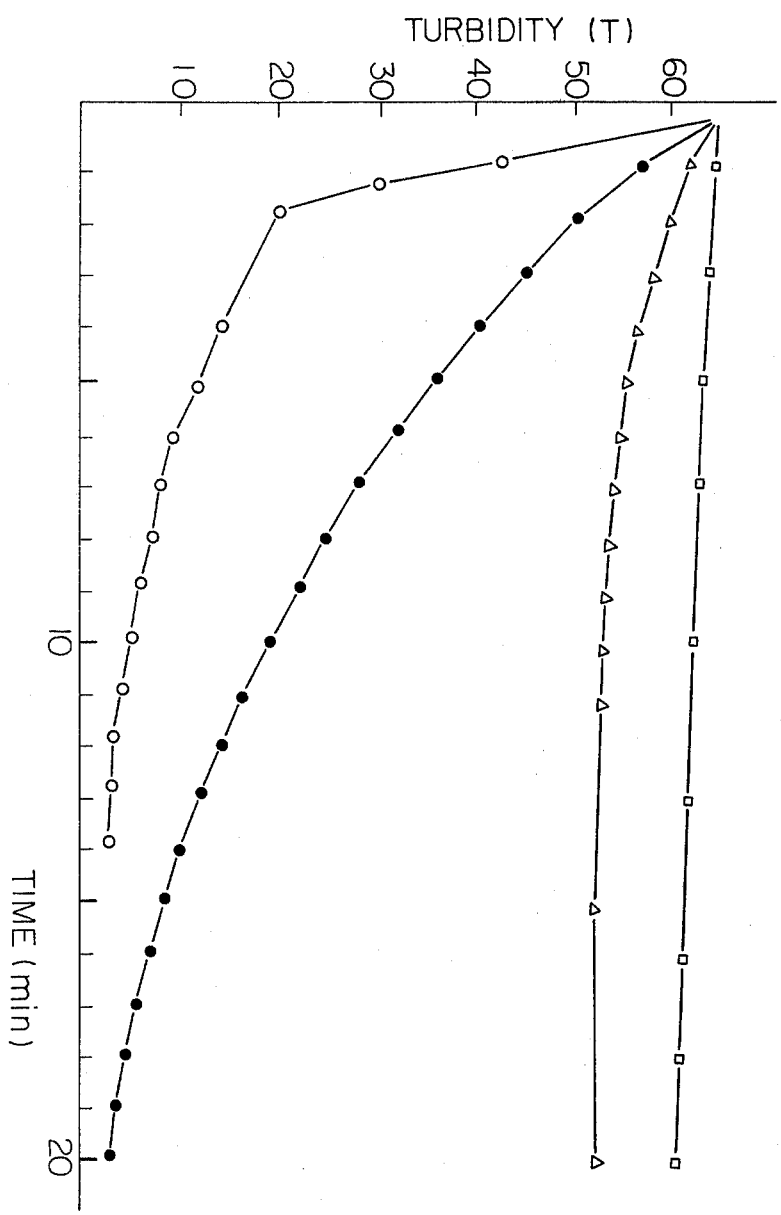

CATIONIC POLYMERS OF TERTIARY, DIAMINES, BIS(CHLOROACETYL)GLYCOLS AND TRIS(N,N-DIMETHYL AMINO ALKYL)PHENOL

This invention relates to a class of novel cationic polymers mainly comprising a. a repeating unit represented by the formula

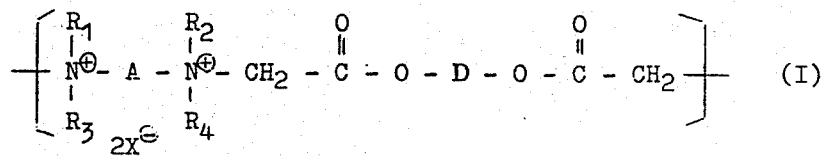

wherein A and D are respectively a divalent radical selected from the group consisting of a straight or branched alkylene, a straight or branched alkylene containing, as a part thereof, a double bond, a triple bond or a radical —($CH_2CH_2O$)$_y$—$CH_2CH_2$—, wherein y is an integer of from 1 to 20, xylylene and cyclohexylene; $R_1$, $R_2$, $R_3$ and $R_4$ each represents a lower alkyl group, or $R_1$ and $R_2$ and/or $R_3$ and $R_4$, when taken together with nitrogen atoms to which they are attached, may respectively form a heterocyclic ring; and X represents a halogen atom, and partially containing one or more other repeating units selected from a class consisting of:

b. a repeating unit represented by the above general formula (I) wherein A is a polyamine residue such as

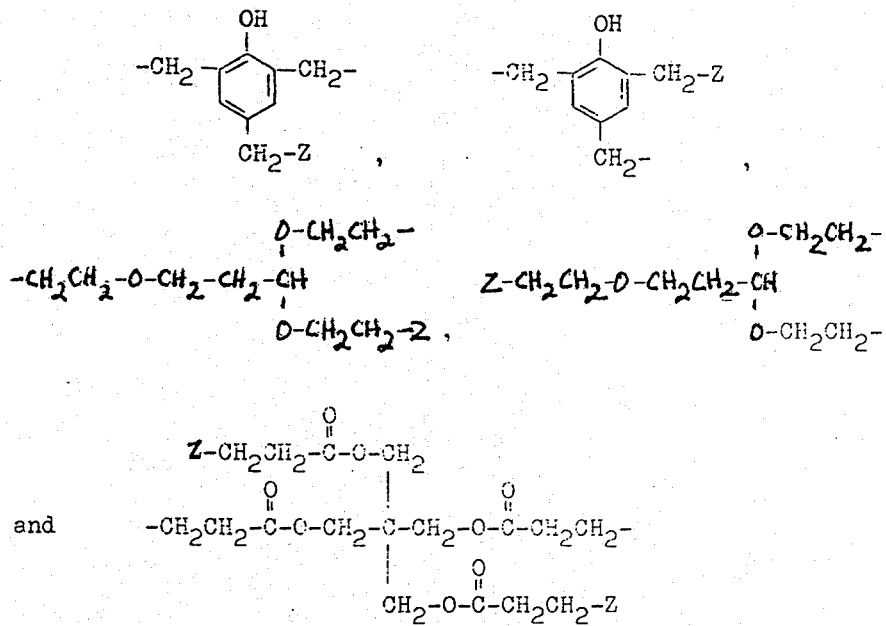

wherein Z represents

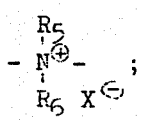

and $R_5$ and $R_6$ are respectively a lower alkyl group; and B, $R_1$, $R_2$, $R_3$, $R_4$ and X are as defined in the above (a);

c. a repeating unit represented by the above general formula (I) wherein D represents a polyhydric alcohol residue such as

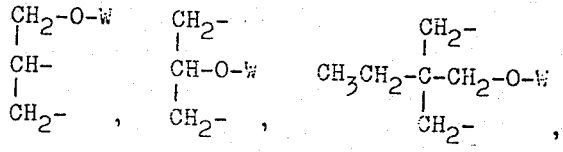

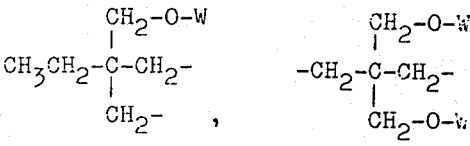

and a chloroacetylated glucose residue, where W represents —$COCH_2$—; and A, $R_1$, $R_2$, $R_3$, $R_4$ and X are as defined in the above (a); and d. a repeating unit represented by the above general formula (I) whereby A and D are as defined in the above (b) and (c) respectively, and $R_1$, $R_2$, $R_3$, $R_4$ and X are as defined in the above (a).

The polymers of this invention are useful for pharmaceutical preparations. Also, because of their coagulating or flocculating activities, they can be beneficially used for a wide variety of water treatments such as clarifying crude water in the reservoir for water supply, industrial water and sewage or drainage water.

In accordance with this invention, any of the novel polymers defined by the formula (I) can be prepared by reacting in an organic solvent compound represented by the formula (II)

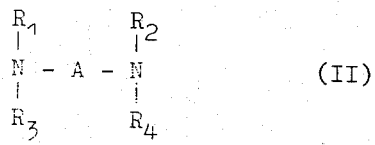

(II)

wherein A, $R_1$, $R_2$, $R_3$ and $R_4$ are as defined in the above (a), and a compound represented by the formula

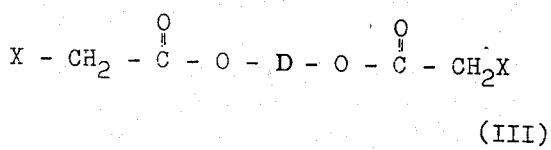

(III)

wherein D and X are as defined in the above (a), as the main reactants together with a polyamine (IV) in an amount of several mole percent of compound (II), or a polyhaloacetyl polyhydric alcohol (V) in an amount of several mole percent of compound (III), or polyamine (IV) in an amount of several mole percent of compound (II) and polyhaloacetyl polyhydric alcohol (V) in an amount of several mole percent of compound (III), which are polyfunctional components.

The process for preparing the polymer of this invention is now explained in detail.

The starting material (II) used in the present invention may be any of the tertiary diamines and includes, for example, 1,4-dimethylpiperazine, triethylenediamine, N,N,N',N'-tetramethylethylenediamine, N,N,N',N'-tetramethylpropylenediamine, N,N,N',N'-tetramethylhexamethylenediamine, N,N,N',N'-tetramethylxylylenediamine, bis($\beta$-N,N-dimethylaminoethoxy)ethane and the like; and N,N,N',N'-tetramethylethylenediamine, N,N,N',N'-tetramethylhexamethylenediamine, and bis($\beta$-N,N-dimethylaminoethoxy)ethane are preferred materials economically.

The second starting material (III) is obtained by the reaction of monohaloacetic acid with an appropriate glycol and includes, for example, bis(chloroacetyl)ethylene glycol, bis(chloroacetyl)-1,4-butanediol, bis(chloroacetyl)-1,10-decanediol, bis(chloroacetyl)cyclohexanediol, bis(chloroacetyl)xylylene glycol, bis(chloroacetyl)-butyndiol, bis(chloroacetyl)butenediol, bis(chloroacetyl)-2,3-butanediol, bis(chloroacetyl)-polyethylene glycol, bis(chloroacetyl)-1,3-propanediol, and the like.

The third starting material (IV) includes, for example, 2,4,6-tris(N,N-dimethylaminomethyl)phenol, 1,1,-3-tris($\beta$-N,N-dimethylaminoethoxy)propane, tetrakis($\beta$-N,N-dimethylaminopropionyl)pentaerythritol, tris($\beta$-N,N-dimethylaminopropionyl)trimethylolpropane, tris($\beta$-N,N-dimethylaminopropionyl)glycerol, and the like.

The fourth starting material (V) includes, for example, tetrakis(chloroacetyl)pentaerythritol, tris(chloroacetyl)trimethylolpropane, tris(chloroacetyl)-glycerol, chloroacetylated sorbitols and glucose, and the like.

The process for preparing novel polymers of this invention comprises dissolving the above-mentioned compounds (II) and (III) together with compound (IV) in an amount corresponding to several mole percent, preferably less than 10 mole percent, of compound (II) or compound (V) in an amount corresponding to several mole percent, preferably less than 10 mole percent, of compound (III), or compound (IV) in an amount corresponding to several mole percent, preferably less than 10 mole percent, of compound (II) and compound (V) in an amount corresponding to several mole percent, preferably less than 10 mole percent, of compound (III) in an organic solvent such as methanol, ethanol, acetone, ethyl acetate, tetrahydrofuran, methyl ethyl ketone, acetonitrile, benzene, cyclohexane, toluene, chloroform, cyclohexanone, tetrahydrothiophene-1,1-dioxide (sulfolane), N,N-dimethyl formamide or a mixture thereof and heating the solution at a temperature between 0°C and a refluxing temperature inclusively, preferably between 10° and 50°C inclusively to conduct the reaction.

In order to smoothly carry out the reaction and obtain the product in high degree of polymerization and in high yield, it is necessary to employ the reactant compounds in a proportion that the ratio of the number of the whole functional groups of compounds (II) and (IV) and that of compounds (III) and (V) is 1:1. For instance, suppose that $a$ moles of compound (II) and $b$ moles of compound (III) are used together with $c$ moles of compounds (IV) of which the number of the functional groups is $p$ and $d$ moles of compound (V) of which the number of the functional groups is $q$, then the relation is expressed by the following equation:

$$2a + pc = 2b + qd$$

In the process of this invention, in addition to the reaction between compound (II) and compound (III), reactions partly take place between compound (II) and compound (V), between compound (III) and compound (IV) as well as between compound (IV) and compound (V). Therefore formation of polymers of lower degree of polymerization, caused by termination of propagation, which is a common phenomenon in the field of polymer chemistry, is prevented and thus products of high degree of polymerization are obtained.

Molecular weight of the products of this invention is normally in the range of from several tens of thousands to two hundreds of thousands. The molecular weight of the polymer product of Example 16 as described hereinafter was approximately about $6.5 \times 10^4$ when it was determined by the light-scattering measurement after purification by reprecipitating the product.

It is commonly observed in polymerization reactions of polyfunctional monomers such as compounds (IV) and (V) that cross-linking occurs to develop reticular structure resulting in formation of insoluble polymers. Such tendency is observed in the process of this invention, too, especially when the tetrahydrothiophene-1,1-dioxide (sulfolane), N,N-dimethylformamide, and the like are used as a solvent. These solvents dissolve low-molecular weight polymers and therefore reactions proceed between the low-molecular polymers and the reactant compounds and/or between the low-molecular polymers per se giving polymers of high degree of polymerization, sometimes insoluble polymers.

The starting materials (III) and (V) used in the process of this invention are extremely reactive owing to the halogen atoms attached to the $\alpha$-positions to the carbonyl groups

and give polymers of high degree of polymerization degree in a high yield even under rather mild conditions. This fact makes it possible to employ less reactive chloride as the quaternarizing agent in place of iodide and bromide which have been the halide of choice in the conventional quaternarizing reaction because of their higher reactivity though they are disadvantageous in handling and cost. It is one of the remarkable features of this invention that, by utilizing chloride, which is easily available and handled, the polymers of high degree of polymerization can be obtained without the risk which is accompanied with the use of iodide or bromide.

The polymers of this invention are a novel cationic polyelectrolite containing quaternary ammonium salt portions in its molecule.

One characteristic of this polyelectrolyte is that, when it is added to turbid sewage or drainage water in relatively small amounts, the water is clarified by, unlike the conventional nonionic or anionic polyelectrolyte, neutralizing the negative zeta-potential of microparticles suspended therein thereby flocculating and sedimenting the particles, and that this polyelectrolyte can effectively be used for such a purpose over the wide range of pH value because it will not be in an insoluble state over that pH value.

The invention is now illustrated by way of working examples of preparation and experiments showing effect of the products. These are only for the better understanding of this invention and are never intended to limit the invention thereto.

The attached FIGURE is a diagram showing the coagulating effect of the polymer of this invention in comparison with that of the conventional coagulants.

EXPERIMENT 1

0.1 g of crystalline sericite, the particle size of which is 2 $\mu$ or less in diameter, was added to 1 liter of water and vigorously agitated. The resulting suspension was formed to be stable and had not cleared even after being allowed to stand for 1 week.

To this suspension, 0.3 mg of a polymer prepared in Example 7 described hereinafter was added, and the suspension was thoroughly stirred with a magnetic stirrer. The turbidity of the suspension was periodically determined with a turbidimeter.

The same test was carried out with respect to aluminium sulfate and sodium alginate, which are typical conventional coagulating agents. The results are shown in the FIGURE.

In the drawing:

The curve "— □ —" indicates the control sample in which no coagulating agent was used; the curve "—△—" indicates a sample in which 10 ppm of sodium alginate was added; the curve "— ● —" stands for a sample in which 180 ppm of aluminium sulfate was added; and the curve "—○—" indicates a sample in which 3 ppm of the polymer of Example 7 was used. In all these tests, pH of the suspension was 7.0.

EXPERIMENT 2

When granulated crystalline sericite, the particle size of which is 10–40$\mu$ in diameter, is suspended in water at a level of 0.5 percent or less the sedimentation takes place extremely slowly. To such stable suspensions that do not exhibit rapid spontaneous sedimentation, the polymers of this invention prepared in Examples 1, 2, 6, 7, 8, 12, 13 and 14 were added, and it was revealed that they have good sedimentation-promoting effect. The results are summarised in Table 1.

Table 1

| Additive | Concentration (p.p.m.) | Sedimentation rate (cm/min) | Turbidity of supernatant after 30 minutes standing |
|---|---|---|---|
| Polymer of Example 1 | 4 | 5 | 2 |
| Polymer of Example 2 | 3 | 6 | 2 |
| Polymer of Example 6 | 3 | 5 | 2 |
| Polymer of Example 7 | 3 | 7 | 2 |
| Polymer of Example 8 | 3 | 6 | 2 |
| Polymer of Example 12 | 5 | 7 | 2 |
| Polymer of Example 13 | 2 | 6 | 2 |
| Polymer of Example 14 | 3 | 6 | 2 |
| Sodium alginate | 5 | 9 | 17 |
| Aluminum sulfate | 50 | 3 | 2 |
| None | — | 0 | — |

Turbidity was measured as follows.

A 0.3 percent suspension of sericite was placed in a measuring cylinder 2.8 cm in inner diameter and 23 cm in height and each of the above additives was added to the suspension at concentration indicated in the table. The total volume of each sample was adjusted to 100 ml. The cylinders containing the samples were allowed to stand after being inverted 20 times at a predetermined frequency. After 30 minutes' standing 10 ml of the supernatant of each sample was taken out and the turbidity thereof was determined with a turbidimeter.

EXPERIMENT 3

A 0.1 percent aqueous suspension of crystalline of sericite having the particle size of 10 to 40 $\mu$, which contains 100 ppm of sodium laurylbenzene sulfonate dissolved therein, is very stable and the sedimentation of the sericite particles occurs at extremely slow rate.

To this suspension, the polymer of Example 6 was added in an amount corresponding to 10 ppm in suspension. The polymer remarkably accelerated the aggregation and sedimentation of the particles and the concentration of the sodium laurylbenzene sulfonate contained in the supernatant was reduced to approximately 30 percent of the concentration of the control in which no sedimentation-promoting agent.

When the polymer of Example 6 was added to a 100 ppm aqueous solution of sodium laurylbenzene sulfonate in an amount corresponding to 20 ppm, the solution was clarified, a white precipitate being formed.

EXAMPLE 1

To a solution prepared by dissolving 5.555 g of bis(-chloroacetyl)propylene glycol and 0.033 g of tetrakis(-chloroacetyl)pentaerythritol in 50 ml of a mixed solvent (dimethyl formamide : ethanol = 4:1 in volume), 3.256 g of N,N,N',N'-tetramethylpropanediamine was added at room temperature. The mixture was vigorously agitated for 33.5 hours at room temperature, and further agitated at 60°C for 6 hours for completion of the reaction. Thereafter, the reaction product was separated from the solvent, washed with acetone and dried under reduced pressured. A highly hygroscopic white polymer (6.25 g) was obtained. $\eta_{sp/c} = 0.054$ (reduced viscosity at 30 ± 0.025°C in concentration of 0.5 percent in a 0.4 M aqueous solution of NaCl)

EXAMPLE 2

To a solution prepared by dissolving 2.431 g of bis(-chloroacetyl)-1,4-butanediol in 40 ml of a mixed solvent (acetone : methanol = 99:1 in volume), 1.5726 g of N,N,N',N'-tetramethylhexamethylenediamine and 0.0799 g of tetrakis($\beta$-N,N-dimethylaminopropionyl)-pentaerythritol were added and the mixture was agitated at room temperature. As the reaction proceeded, a white viscous substance was deposited and the reaction mixture became viscous until agitation became impossible in about 10 hours. The reaction product was separated from the solvent, washed with acetone and was dried under reduced pressure. A hygroscopic white powder was obtained. (3.55 g, $\eta_{sp/c} = 0.136$)

EXAMPLE 3

To a solution prepared by dissolving 1.7263 g of N,N,N',N'-tetramethylhexamethylenediamine in 50 ml of ethyl acetate, 2.4110 g of bis(chloroacetyl)-2,3-butanediol and 0.0221 g of tetrakis(chloroacetyl)pentaerythritol were added and the mixture was agitated at room temperature. After the reaction was completed, the solvent was removed by decantation, and the precipitate was collected by filtration, washed with acetone and was dried under reduced pressure. A hygroscopic white powder was obtained. (3.7 g, $\eta_{sp/c} = 0.277$)

EXAMPLE 4

To a solution prepared by dissolving 1.1682 g of N,N,N',N'-tetramethylethylenediamine and 0.0275 g of 2,4,6-tris-N,N-(dimethylaminomethyl)phenol in 50 ml of acetone, 5.7919 g of bis(chloroacetyl)nonaethylene glycol was added and the mixture was stirred at room temperature for 5 days. After the reaction was completed, the solvent was removed by decantation, and the precipitate was collected by filtration, washed with acetone and dried under reduced pressure. A hygroscopic white powder was obtained. (5.3 g, $\eta_{sp/c} = 0.224$)

EXAMPLE 5

To a solution prepared by dissolving 4.638 g of bis(-chloroacetyl)butyndiol and 0.145 g of tris(chloroacetyl)trimethylolpropane in 50 ml of sulfolane, 2.2444 g of triethylenediamine was added and the mixture was vigorously agitated at room temperature. After about one hour, a white curdy precipitate was formed. After the reaction mixture was stirred at room temperature for about 24 hours including 1 hour prior to formation of precipitate, the mixture was heated at 60°C and was agitated for 6 hours at said temperature. The reaction product was treated as in Example 1 and a highly hygroscopic polymer was obtained. (5.86 g, $\eta_{sp/c} = 0.050$)

EXAMPLE 6

To a solution prepared by dissolving 15.606 g of bis(-chloroacetyl)triethylene glycol in 500 ml of sulfolane, 10.216 g of 1,2-bis($\beta$-N,N-dimethylaminothoxy)-ethane and 0.306 g of 1,1,3-tris($\beta$-N,N-dimethylaminoethoxy)-propane were added, and the mixture was agitated at room temperature for 50 hours. The reaction mixture was then poured into 2 liters of acetone, and a white precipitate was formed. The solvent (acetone and sulfolane) was removed by decantation; the product was collected, washed with acetone and dried under reduced pressure, and a hygroscopic white powder was obtained. (21.5 g, $\eta_{sp/c} = 0.08$)

EXAMPLE 7

To a solution prepared by dissolving 27.325 g of bis(-chloroacetyl)cyclohexane-1,4-diol in 500 ml of dimethylformamide, 19.23 g of N,N,N',N'-tetramethyl-m-xylylenediamine and 0.265 g of 2,4,6-tris(N,N-dimethylaminomethyl)phenol were added, and the mixture was agitated. The reaction proceeded at room temperature and a white precipitate was gradually formed. After the mixture was allowed to react for about 100 hours at room temperature, the solvent was removed by decantation. The product was collected, washed with acetone and dried under reduced pressure, and a hygroscopic white powder was obtained. (41.5 g, $\eta_{sp/c} = 0.23$)

EXAMPLE 8

To a solution prepared by dissolving 24.3 g of bis(-chloroacetyl)-1,4-butanediol and 0.364 g of tris-(chloroacetyl)trimethylolpropane in 500 ml of cyclohexanone was added 17.31 g of N,N,N',N'-tetramethylhexamethylenediamine and 0.265 g of 1,4,6-tris(N,N-dimethylaminomethyl)-phenol, and the mixture was agitated at room temperature. After about 2 hours' agitation, a white precipitate was formed. After about 70 hours' reaction, the solvent was removed from the reaction mixture and the reaction product was washed with acetone and dried under reduced pressure to obtain 46 g of a hygroscopic white powder. ($\eta_{sp/c} = 0.126$)

EXAMPLE 9

To a solution prepared by dissolving 12.15 g of bis(-chloroacetyl)-1,4-butanediol and 0.364 g of tris-(chloroacetyl)trimethylolpropane in 200 ml of cyclohexanone was added 8.62 of N,N,N',N'-tetramethylhexamethylenediamine and 265 mg of 2,4,6-tris(N,N-dimethylaminomethyl)-phenol, followed by stirring at room temperature. As the reaction proceeded, a viscous substance was deposited at the bottom of the reactor. After about 50 hours' reaction the solvent was removed from the reaction mixture, and the reaction product was washed with acetone and dried under reduced pressure to obtain 16.8 g of a pale yellow water-insoluble swollen substance.

EXAMPLE 10

To a solution prepared by dissolving 1.7264 g of N,N,N',N'-tetramethylhexamethylenediamine and 0.0280 g of 2,4,6-tris(N,N-dimethylaminomethyl)phenol in 50 ml of acetone, 2.4154 g of 1,4-bis(chloroacetyl)-butenediol-2 and 0.0175 g of tetrakis(chloroacetyl)-pentaerythritol were added, and the mixture was stirred at room temperature for 5 days. After the reaction was completed, the solvent was removed by decantation. The product was collected, washed with acetone, dried under reduced pressure, and a hygroscopic white powder was obtained. (3.7 g, $\eta_{sp/c} = 0.285$)

EXAMPLES 11-16

Using various starting materials, various polymers represented by the above-mentioned general formula were prepared following the procedures of the above-explained working examples. Structures of the polymers produced and the reaction conditions are summarized in Table 2.

Table 2

| Example No. | A | $R_1$ | $R_2$ | $R_3$ | $R_4$ | D | X | Solvent | Temp. (°C) | Time (hr) | Additive | Amount of addition (mol %) | Viscosity[6] when additive is added |
|---|---|---|---|---|---|---|---|---|---|---|---|---|---|
| 11 | $(CH_2)_3$ | $CH_3$ | $CH_3$ | $CH_3$ | $CH_3$ | $(CH_2)_2$ | Cl | Me$_2$CO:MeOH 99:1 | R.T.[1] | 20 | T.P.[2] | 2 | 0.098 |
| 12 | $(CH_2)_6$ | $CH_3$ | $CH_3$ | $CH_3$ | $CH_3$ | $(CH_2)_{10}$ | Cl | Ethyl acetate | R.T.+60°C | 80+6 | T.P.[2] | 1 | 0.095 |
| 13 | $CH_2$-⟨⟩-$CH_2$ | $CH_3$ | $CH_3$ | $CH_3$ | $CH_3$ | $CH_2$-⟨⟩-$CH_2$ | Cl | Benzene | R.T.+60°C | 70.5+6 | T.G.[3] | 2 | 0.064 |
| 14 | $(CH_2)_2$ | $CH_3$ | $CH_3$ | $CH_2$—$CH_2$ | | -⟨H⟩- | Cl | CHCl$_3$:DMF 4:1 | R.T.+60°C | 66+6' | T.P.[2] | 2 | 0.069 |
| 15 | $(CH_2CH_2O)_2$-$CH_2CH_2$ | $CH_3$ | $CH_3$ | $CH_3$ | $CH_3$ | $(CH_2CH_2O)_2$-$CH_2CH_2$ | Cl | Me$_2$CO | R.T.+60°C | 21+6 | T.G.L.[4] | 3 | 0.115 |
| 16 | $(CH_2)_6$ | $CH_3$ | $CH_3$ | $CH_3$ | $CH_3$ | $(CH_2)_4$ | Cl | Sulfolane | R.T.+50°C | 3+2 | T.P. | 1 | 0.401 |
| 17 | $(CH_2)_6$ | $CH_3$ | $CH_3$ | $CH_3$ | $CH_3$ | $(CH_2)_4$ | Cl | Sulfolane:DMF 1:1 | 40°C | 5 | T.M.P.[5] | 1 | 0.920 |

[1] R.T. means room temperature
[2] tetrakis(chloroacetyl)pentaerythritol
[3] tris(chloroacetyl) glycerol
[4] chloroacetylated glucose containing 28.41% chlorine
[5] tris(chloroacetyl)trimethylolpropane
[6] reduced viscosity determined with respect to 0.5% solution of each polymer in 0.4M NaCl solution

What we claim is:
1. A cationic polymer mainly comprising:
a. a repeating unit represented by the formula

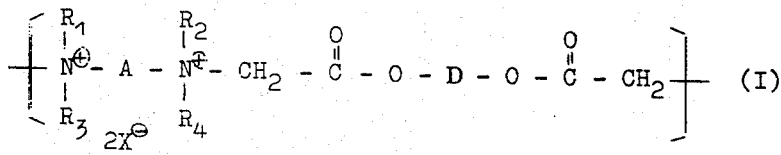

$$\left[ \begin{array}{c} R_1 \\ | \\ N^{\oplus}- A - N^{\oplus}- CH_2 - \overset{O}{\overset{\|}{C}} - O - D - O - \overset{O}{\overset{\|}{C}} - CH_2 \\ | \\ R_3 \quad 2X^{\ominus} \quad R_4 \end{array} \right] \quad (I)$$

wherein A and B are respectively a divalent radical selected from a class consisting of a straight or branched alkylene, a straight or branched alkylene containing, as a part thereof, a double bond, a triple bond, or a radical $-(CH_2CH_2O)_y-CH_2CH_2-$, wherein $y$ is an integer of from 1 to 20, xylylene and cyclohexylene; $R_1$, $R_2$, $R_3$ and $R_4$ each represents a lower alkyl group, or $R_1$ and $R_2$, and/or $R_3$ and $R_4$, when taken together with nitrogen atoms to which they are attached, may respectively form a heterocyclic ring; and X represents a halogen atom, and partially containing up to 10 mol percent of one or more other repeating units selected from a class consisting of:

b. a repeating unit represented by the above general formula (I) wherein A represents a polyamine residue selected from a class consisting of

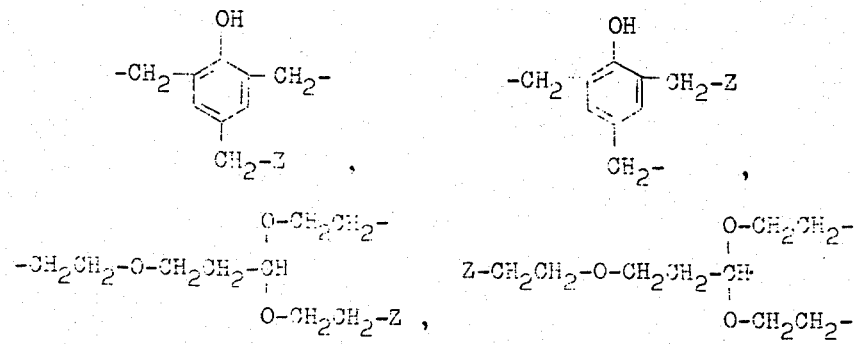

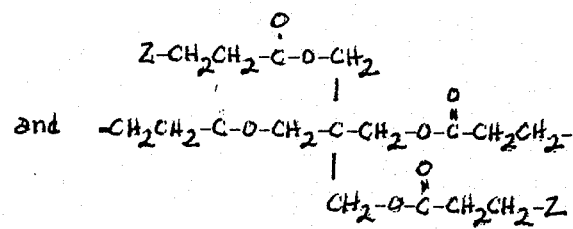

wherein Z represents

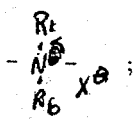

$R_5$ and $R_6$ are respectively a lower alkyl group; and B, $R_1$, $R_2$, $R_3$, $R_4$ and X are as defined in the above (a);

c. a repeating unit represented by the above general formula (I) wherein D represents a polyhydric alcohol residue containing 28.14 percent chlorine selected from a class consisting of

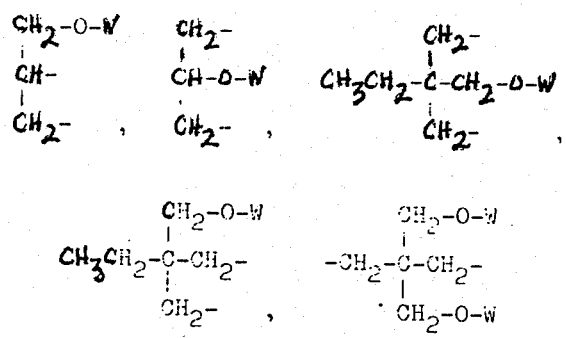

and a chloroacetylated glucose residue, wherein W represents $-COCH_2-$; and A, $R_1$, $R_2$, $R_3$, $R_4$ and X are as defined in the above (a); and d. a repeating unit represented by the above general formula (I) wherein A and B are respectively as defined in the above (D) and (c), and $R_1$, $R_2$, $R_3$, $R_4$ and X are as defined in the above (a).

2. A cationic polymer as set forth in claim 1, wherein A in the main repeating unit is $-(CH_2)_3-$ and D in the main repeating unit is $-(CH_2)_3-$; $R_1$, $R_2$, $R_3$ and $R_4$ are respectively $-CH_3$, and X is Cl; and B in the partially contained repeating unit is

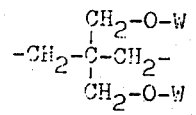

wherein W represents

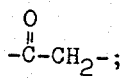

and A in the partially contained repeating unit is the same as that in the main repeating unit.

3. A cationic polymer as set forth in claim 1, wherein A in the main repeating unit is $-(CH_2)_6-$ and D in the main repeating unit is $-(CH_2)_4-$, $R_1$, $R_2$, $R_3$ and $R_4$ are respectively $-CH_3$, X is Cl; and A in the partially contained repeating unit is

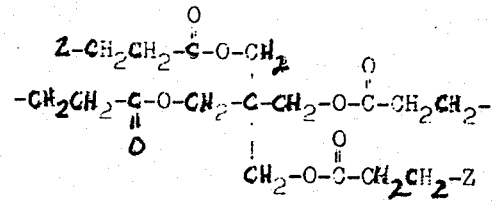

wherein Z represents

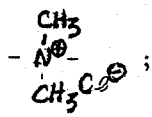

and B in the partially contained repeating unit is the same as that in the main repeating unit.

4. A cationic polymer as set forth in claim 1, wherein A in the main repeating unit is $-(CH_2)_6-$; D in the main repeating unit is

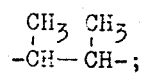

$R_1$, $R_2$, $R_3$ and $R_4$ are respectively $-CH_3$, X is Cl; and D in the partially contained repeating unit is

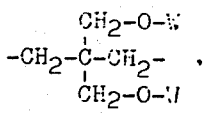

wherein W represents

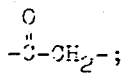

and A in the partially contained repeating unit is the same as that in the main repeating unit.

5. A cationic polymer as set forth in claim 1, wherein A in the main repeating unit is $-(CH_2)_2-$; D in the main repeating unit is $-(CH_2CH_2O)_8CH_2CH_2-$; $R_1$, $R_2$, $R_3$ and $R_4$ are respectively $-CH_3$; and X is Cl; and A in the partially contained repeating unit is a group selected from a class consisting of

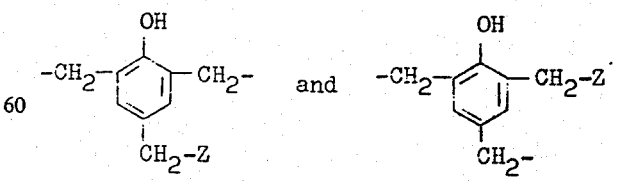

wherein Z represents

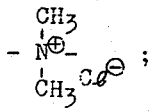

and D in the partially contained repeating unit is the same as that in the main repeating unit.

6. A cationic polymer as set forth in claim 1, wherein A, $R_1$, $R_2$, $R_3$ and $R_4$ in the main repeating unit form

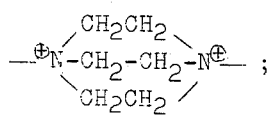

D in the main repeating unit is —$CH_2C \equiv C \cdot CH_2$—; X is Cl; and D in the partially contained repeating unit is a group selected from a class consisting of

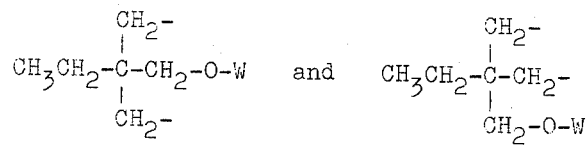

wherein W represents

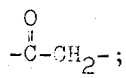

and A in the partially contained repeating unit is as defined above.

7. A cationic polymer as set forth in claim 1, wherein A in the repeating unit is —$(CH_2CH_2O)_2CH_2CH_2$—; D in the main repeating unit is —$(CH_2CH_2O)_2CH_2CH_2$—; $R_1$, $R_2$, $R_3$ and $R_4$ are respectively $CH_3$; X is Cl; A in the partially contained repeating units is a group selected from a class consisting of

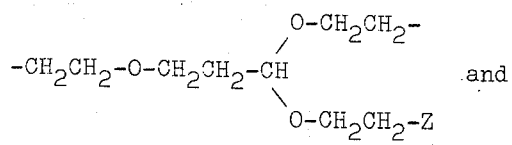

wherein Z represents

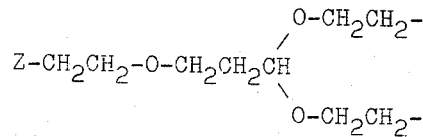

and D in the partially contained repeating unit is the same as that in the main repeating unit.

8. A cationic polymer as set forth in claim 1, wherein A in the main repeating unit is

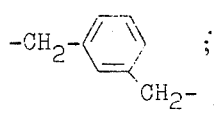

D in the main repeating unit is

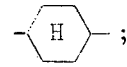

$R_1$, $R_2$, $R_3$ and $R_4$ are respectively —$CH_3$; X is Cl; A in the partially contained repeating unit is a group selected from a class consisting of

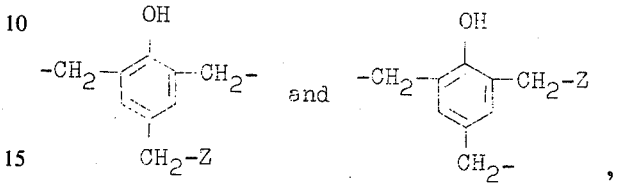

wherein Z represents

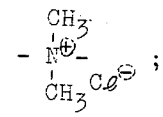

and D in the partially contained repeating unit is the same as that in the main repeating unit.

9. A cationic polymer as set forth in claim 1, wherein A in the main repeating unit is —$(CH_2)_6$—, D in the main repeating unit is —$(Ch_2)_4$—; $R_1$, $R_2$, $R_3$ and $R_4$ are respectively —$CH_3$; X is Cl; A in the partially contained repeating unit is a group selected from a class consisting of

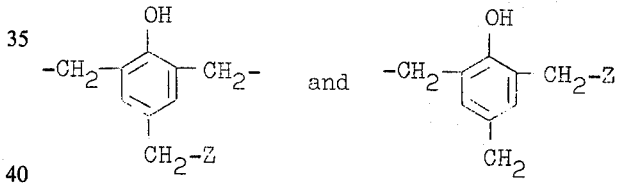

wherein Z represents

and D in the partially contained repeating unit is a group selected from a class consisting of

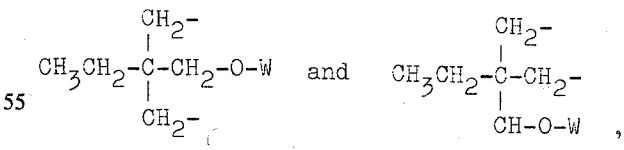

wherein W represents

10. A cationic polymer as set forth in claim 1, wherein A in the main repeating unit is —$(CH_2)_6$—; D in the main repeating unit is —$CH_2CH=CHCH_2$—; $R_1$, $R_2$, $R_3$ and $R_4$ are respectively —$CH_3$; X is Cl; A in the partially contained repeating unit is a group selected from a class consisting of

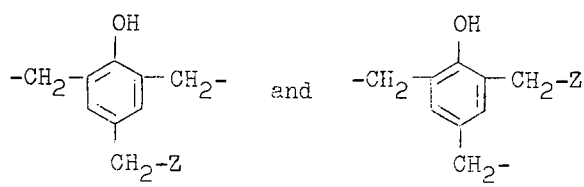

wherein Z represents

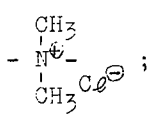

and D in the partially contained repeating unit is

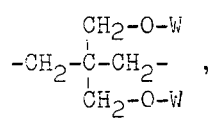

wherein W represents

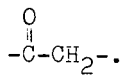

11. A cationic polymer as set forth in claim 1, wherein A in the main repeating unit is —(CH$_2$)$_3$—; D in the main repeating unit is —(CH$_2$)$_2$—, R$_1$, R$_2$, R$_3$ and R$_4$ are respectively —CH$_3$; X is Cl; D in the partially contained repeating unit is

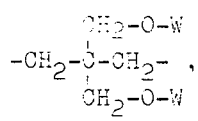

wherein W represents

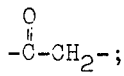

and A in the partially contained repeating unit is the same as that of the main repeating unit.

12. A cationic polymer as set forth in claim 1, wherein A in the main repeating unit is —(CH$_2$)$_6$—; R$_1$, R$_2$, R$_3$ and R$_4$ are respectively —CH$_3$; X is Cl; D in the main repeating unit is —(CH$_2$)$_{10}$—; D in the partially contained repeating unit is

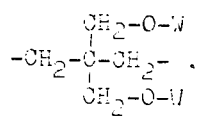

wherein W represents

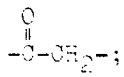

and A in the partially contained repeating unit is the same as that in the main repeating unit.

13. A cationic polymer as set forth in claim 1, wherein A in the main repeating unit is

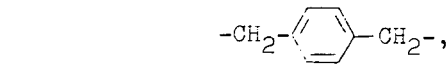

D in the main repeating unit is

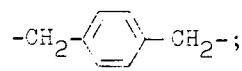

R$_1$, R$_2$, R$_3$ and R$_4$ are respectively —CH$_3$; X is Cl; D in the partially contained repeating unit is a group selected from a class consisting of

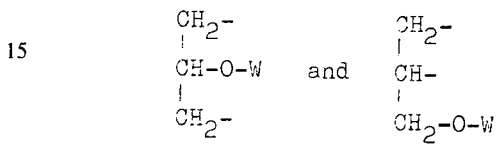

wherein W represents

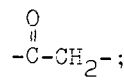

and A in the partially contained repeating unit is the same as that in the main repeating unit.

14. A cationic polymer as set forth in claim 1, wherein A, R$_1$, R$_2$, R$_3$ and R$_4$ in the main repeating unit form

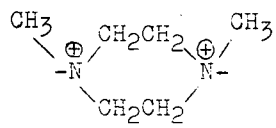

together with the nitrogen atoms; D in the main repeating unit is

X is Cl; D in the partially contained repeating unit is

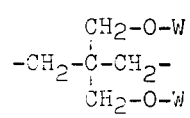

wherein W represents

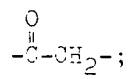

and A in the partially contained repeating unit is the same as that in the main repeating unit.

15. A cationic polymer as set forth in claim 1, wherein A in the main repeatng unit is —(CH$_2$C-H$_2$O)$_2$CH$_2$CH$_2$—; D in the main repeating unit is —(CH$_2$CH$_2$O)$_2$CH$_2$CH$_2$—; R$_1$, R$_2$, R$_3$ and R$_4$ are respectively —CH$_3$; X is Cl; B in the partially contained repeating unit is said chloroacetylated glucose residue, and A in the partially contained repeating unit is the same as that in the main repeating unit.

16. A cationic polymer as set forth in claim 1, wherein A in the main repeating unit is —(CH$_2$)$_6$—; D in the main repeating unit is —(CH$_2$)$_4$—; R$_1$, R$_2$, R$_3$ and R$_4$ are respectively —CH$_3$; X is Cl; D in the partially contained repeating unit is

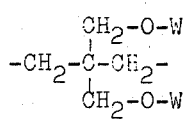

wherein W represents

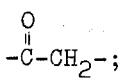

and A in the partially contained repeating unit is the same as that in the main repeating unit.

17. A cationic polymer as set forth in claim 1, wherein A in the main repeating unit is —(CH$_2$)$_6$—, D in the main repeating unit is —(CH$_2$)$_4$—, R$_1$, R$_2$, R$_3$ and R$_4$ are respectively —CH$_3$, X is Cl, D in the partially contained repeating unit is a group selected from a class consisting of

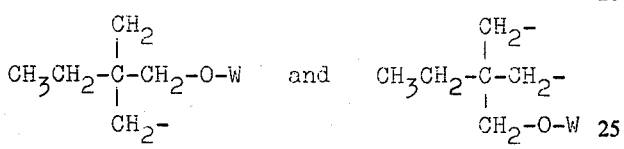

wherein W represents

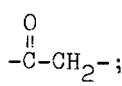

and A in the partially contained repeating unit is the same as that in the main repeating unit.

18. A process for preparing a cationic polymer mainly comprising
    a. a repeating unit represented by the formula

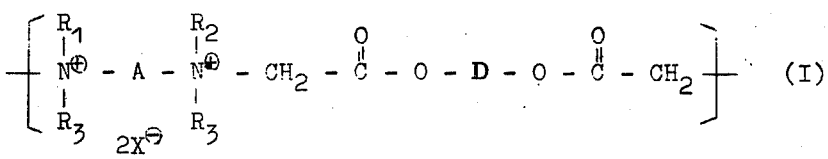

wherein A and D are respectively a divalent radical selected from a class consisting of a straight or branched alkylene, a straight or branched alkylene containing, as a part thereof, a double bond, a triple bond or a radical —(CH$_2$CH$_2$O)$_y$—CH$_2$—CH$_2$—, wherein y is an integer of from 1 to 20, xylylene and cyclohexylene; R$_1$, R$_2$, R$_3$ and R$_4$ each represents a lower alkyl group, or R$_1$ and R$_2$ and/or R$_3$ and R$_4$, when taken together with nitrogen atoms to which they are attached, may respectively from a heterocyclic ring; and X represents a halogen atom; and partially containing more than a trace amount of one or more repeating units selected from a class consisting of:
    b. a repeating unit represented by the above general formula (I) wherein A represents a polyamine residue selected from a class consisting of

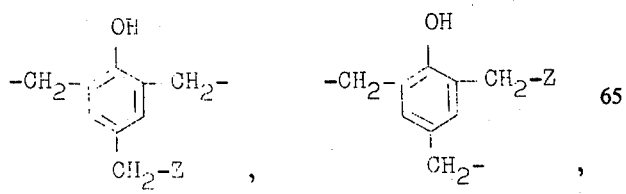

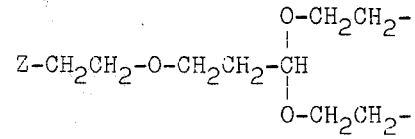

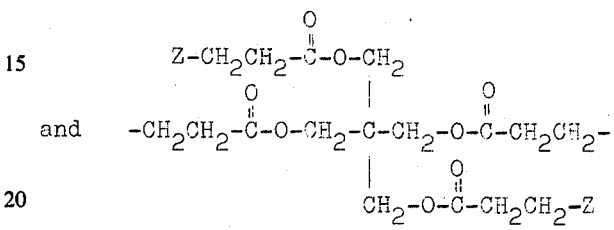

wherein Z represents

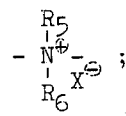

R$_5$ and R$_6$ are respectively a lower alkyl group; and D, R$_1$, R$_2$, R$_3$, R$_4$ and X are as defined in the above (a);

c. a repeating unit represented by the above general formula (I) wherein D represents a polyhydric alcohol residue selected from a class onsisting of

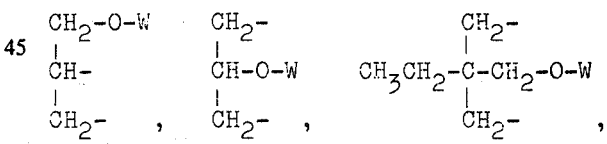

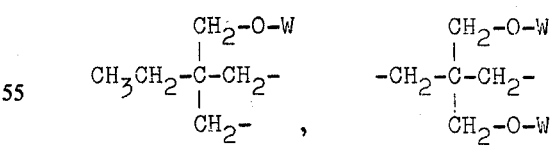

and a chloroacetylated glucose residue, wherein W represents —COCH$_2$—; and A, R$_1$, R$_2$, R$_3$, R$_4$ and X are as defined in the above (a); and d. a repeating unit represented by the above general formula (I) wherein A and D are as defined in the above (b) and (c) respectively, and R$_1$, R$_2$, R$_3$, R$_4$ and X are as defined in the above (a); said process comprising reacting a compound represented by the formula

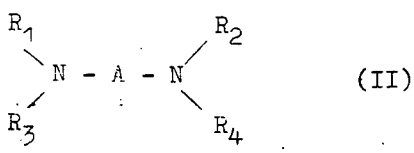

wherein A, $R_1$, $R_2$, $R_4$ are as defined in the above (a), with a compound represented by the formula

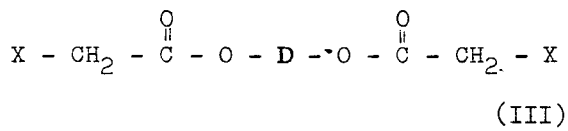

wherein D and X are as defined in the above (a) as main reactants, together with a polyamine (IV) such as

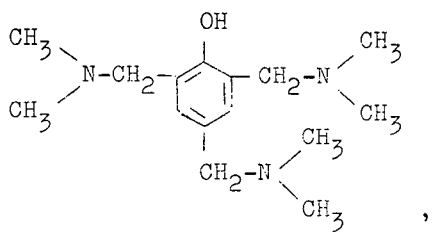

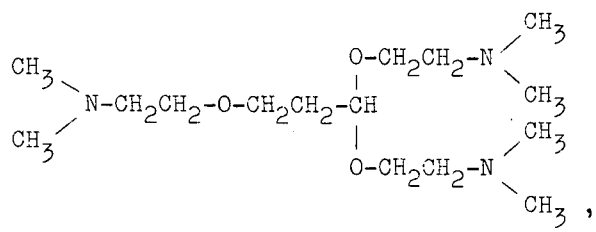

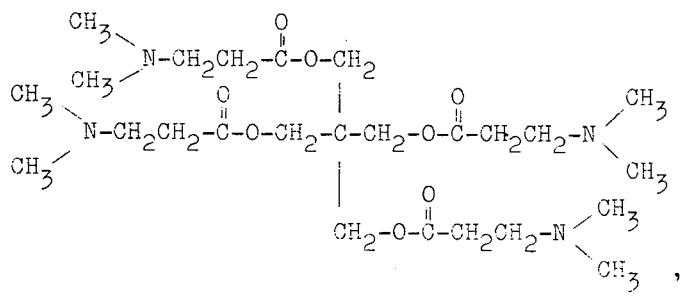

or a polyhaloacetyl polyhydric alcohol (V) such as

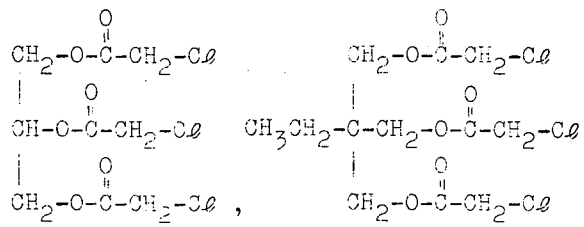

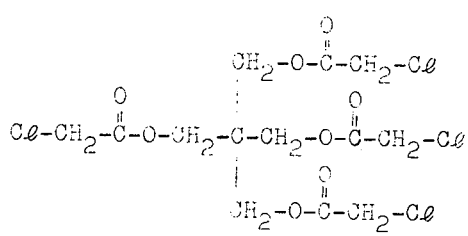

and chloroacetylated glucose or together with up to 10 mol percent of the polyamine (IV) and the polyhydric alcohol (V).

19. A process as set forth in claim 18, wherein the starting materials are used in a proportion that the ratio of total number of the functional groups of compound (II) and compound (IV) and the total number of the functional groups of compound (III) and compound (V) is 1:1.

20. A process as set forth in claim 18, wherein the reaction is conducted in an organic solvent of methanol, ethanol, acetone, ethyl acetate, tetrahydrofuran, methyl ethyl ketone, acetonitrile, benzene, cyclohexane, toluene, chloroform, cyclohexanone, tetrahydrothiophene-1,1-dioxide (sulfolane), N,N-dimethylformamide or a mixture thereof.

21. A process as set forth in claim 18, wherein the reaction is conducted at a temperature between 0° and a refluxing temperature inclusively.

22. A process as set forth in claim 21, wherein the reaction is conducted at a temperature between 10°C and 50°C inclusively.

23. A clarifying agent for turbid water containing at least one of the compounds mainly comprising
a. a repeating units represented by the formula

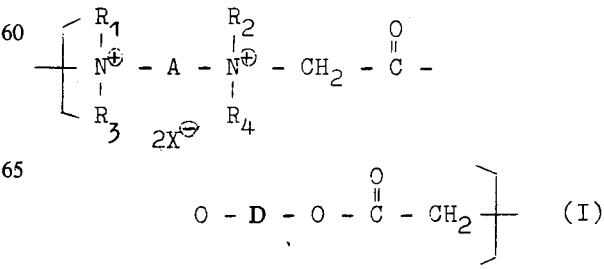

wherein A and D are respectively a divalent group selected from a class consisting of a straight or branched alkylene, a straight or branched alkylene containing, as a part thereof, a double bond, a triple bond or a radical —(CH$_2$CH$_2$O)$_y$—CH$_2$—CH$_2$— wherein y is an integer of from 1 to 20, xylylene and cyclohexylene; R$_1$, R$_2$, R$_3$ and R$_4$ represent a lower alkyl group, or R$_1$ and R$_2$, and/or R$_3$ and R$_4$, when taken together with nitrogen atoms to which they are attached, may respectively form a heterocyclic ring; and X represents a halogen atom, and partially containing up to 10 mol percent of one or more other repeating units selected from a class consisting of b. a repeating unit represented by the above general formula (I) wherein A represents a polyamine residue selected from a class consisting of

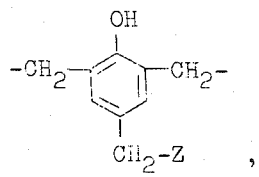, 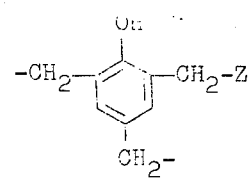,

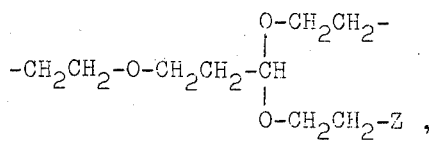 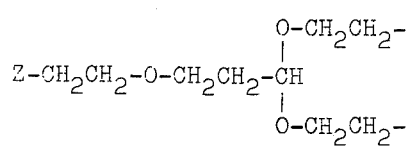

and 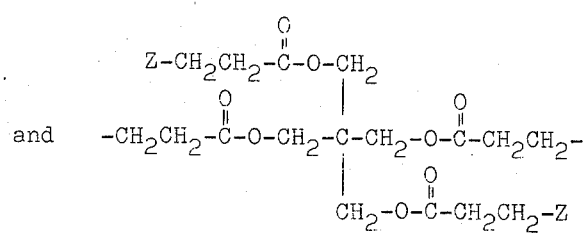

wherein Z represents

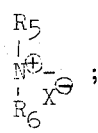 ;

R$_5$ and R$_6$ each represents a lower alkyl group; and D, R$_1$, R$_2$, R$_3$, R$_4$ and X are as defined in the above (a);

c. a repeating unit represented by the above general formula (I) wherein B represents a polyhydric alcohol residue selected from a class consisting of $$\begin{array}{c} CH_2-O-W \\ | \\ CH- \\ | \\ CH_2- \end{array}, \quad \begin{array}{c} CH_2- \\ | \\ CH-O-W \\ | \\ CH_2- \end{array},$$

$$\begin{array}{c} CH_2- \\ | \\ CH_3CH_2-C-CH_2-O-W \\ | \\ CH_2- \end{array},$$

$$\begin{array}{c} CH_2-O-W \\ | \\ CH_3CH_2-C-CH_2- \\ | \\ CH_2- \end{array}, \quad \begin{array}{c} CH_2-O-W \\ | \\ -CH_2-C-CH_2- \\ | \\ CH_2-O-W \end{array}$$

and a chloroacetylated glucose residue, wherein W represents —COCH$_2$—; and A, R$_1$, R$_2$, R$_3$, R$_4$ and X are as defined in the above (a);

d. a repeating unit represented by the above general formula (I) wherein A and B are as defined in the above (b) and (c) respectively and R$_1$, R$_2$, R$_3$, R$_4$ and X are as defined in the above (a).

24. A cationic polymer as set forth in claim 1 wherein A is hexamethylene, B is tetramethylene and R$_1$ through R$_4$ are each methyl.

25. A cationic polymer as set forth in claim 1 comprising the polymerization product of a monomer providing the repeating unit represented by the formula (I) wherein A is hexamethylene, B is tetramethylene and R$_1$ through R$_4$ are methyl, together with tris (chloracetyl) trimethylolpropane.

* * * * *